(12) United States Patent
Vargantwar et al.

(10) Patent No.: US 8,169,962 B1
(45) Date of Patent: May 1, 2012

(54) METHOD AND SYSTEM FOR TRANSMITTING A VOICE MAIL INDICATION TO A MOBILE STATION

(75) Inventors: Sachin R. Vargantwar, Overland Park, KS (US); Deveshkumar Rai, Overland Park, KS (US); Bhagwan Khanka, Lenexa, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 526 days.

(21) Appl. No.: 12/368,906

(22) Filed: Feb. 10, 2009

(51) Int. Cl.
*H04W 4/00* (2009.01)
*H04L 12/66* (2006.01)

(52) U.S. Cl. .................... 370/329; 370/341; 370/352

(58) Field of Classification Search .................. None
See application file for complete search history.

(56) References Cited

U.S. PATENT DOCUMENTS

| | | | |
|---|---|---|---|
| 5,454,026 A * | 9/1995 | Tanaka | 455/437 |
| 6,006,087 A | 12/1999 | Amin | |
| 6,014,559 A | 1/2000 | Amin | |
| 6,418,307 B1 | 7/2002 | Amin | |
| 6,630,883 B1 | 10/2003 | Amin et al. | |
| 7,062,257 B2 | 6/2006 | Amin | |
| 7,409,204 B2 | 8/2008 | Chaudry et al. | |
| 7,616,944 B2 * | 11/2009 | Gustavsson et al. | 455/412.2 |
| 7,620,400 B2 * | 11/2009 | Jacobson et al. | 455/438 |
| 2002/0160756 A1 * | 10/2002 | Amin | 455/413 |
| 2005/0124325 A1 | 6/2005 | Chaudry et al. | |
| 2006/0234683 A1 | 10/2006 | Amin | |
| 2007/0149176 A1 * | 6/2007 | Wells et al. | 455/412.2 |
| 2008/0008163 A1 * | 1/2008 | Castell et al. | 370/352 |
| 2008/0043694 A1 * | 2/2008 | Mousseau et al. | 370/338 |
| 2009/0233580 A1 * | 9/2009 | Amin | 455/412.2 |

* cited by examiner

*Primary Examiner* — Chi Pham
*Assistant Examiner* — Soon-Dong Hyun

(57) ABSTRACT

A radio access network (RAN) receives a request to route a call from a caller to a mobile station, assigns a wireless traffic channel to the mobile station for the call, and detects a no-answer condition for the call (because a user of the mobile station does not answer the call within a predetermined time period or has chosen to ignore the call). In response to the no-answer condition, the RAN redirects the call to a voice mail system and keeps the wireless traffic channel assigned to the mobile station while the caller interacts with the voice mail system. The RAN determines that the caller has left a voice mail message on the voice mail system and transmits an indication of the voice mail message to the mobile station over the wireless traffic channel.

20 Claims, 3 Drawing Sheets

METHOD AND SYSTEM FOR TRANSMITTING A VOICE MAIL INDICATION TO A MOBILE STATION

BACKGROUND

It is common for a subscriber of a wireless service plan to have voice mail service as part of the service plan. That way, if the subscriber's mobile station is called and the subscriber misses the call or ignores the call, the call may be redirected to a voice mail system so that the caller may leave a voice mail message. If a caller does leave a voice mail message for a subscriber, it is common for the wireless network to transmit an indication of the voice mail message to the subscriber's mobile station. Typically, the voice mail indication is transmitted to the mobile station over a paging channel. In response to the voice mail indication, the mobile station may provide a user-discernible indication of the new voice mail message. The subscriber may then be able to use the mobile station to access the voice mail system and listen to the voice mail message.

OVERVIEW

In a first principal aspect, an exemplary embodiment provides a method for transmitting a voice mail indication to a mobile station. A request to route a call from a caller to the mobile station is received. A wireless traffic channel is assigned to the mobile station for the call. A no-answer condition for the call is detected. In response to the no-answer condition, the call is redirected to a voice mail system. The wireless traffic channel is kept assigned to the mobile station while the caller interacts with the voice mail system. After determining that the caller has left a voice mail message on the voice mail system, an indication of the voice mail message is transmitted to the mobile station over the wireless traffic channel.

In a second principal aspect, an exemplary embodiment provides a system comprising a voice mail system for receiving voice mail messages and a radio access network (RAN) for communicating with mobile stations over wireless traffic channels and wireless control channels. The RAN is configured to (i) assign a wireless traffic channel to a mobile station for a call from a caller, (ii) redirect the call to the voice mail system in response to a no-answer condition for the call, and (iii) keep the wireless traffic channel assigned to the mobile station while the caller interacts with the voice mail system, if usage of traffic channel resources is below a predetermined level.

In a third principal aspect, an exemplary embodiment provides a method for a radio access network (RAN), the RAN being able to communicate with mobile stations over wireless traffic channels and wireless control channels. The RAN receives a request to route a call from a caller to a mobile station. The RAN assigns a wireless traffic channel to the mobile station for the call. The RAN detects a no-answer condition for the call. After detecting the no-answer condition, the RAN (a) redirects the call to a voice mail system, (b) determines whether usage of traffic channel resources exceeds a threshold level, (c) if usage of traffic channel resources exceeds the threshold level, the wireless traffic channel is released, and (d) if usage of traffic channel resources does not exceed the threshold level, the RAN keeps the wireless traffic channel assigned to the mobile station while the caller interacts with the voice mail system.

DETAILED DESCRIPTION OF EXEMPLARY EMBODIMENTS

1. Introduction

The inventors have recognized that it can be more efficient to transmit an indication of a voice mail message to a mobile station over a traffic channel instead of a paging channel. For example, a no-answer condition that causes a call to a mobile station to be redirected to a voice mail system may occur after a traffic channel has already been assigned to the mobile station for the call. In that case, it may be more efficient to keep the traffic channel assigned to the mobile station while the caller interacts with the voice mail system. Then, when the caller leaves a voice mail message for a subscriber of the mobile station, an indication of the voice mail message may be transmitted to the mobile station over the traffic channel that is already assigned to the mobile station. With this approach, usage of paging channel resources for transmitting voice mail indications can beneficially be avoided. In addition, by using an already-assigned traffic channel instead of a paging channel, a mobile station may receive a voice mail indication more quickly.

Despite these potential advantages, it may still be preferable to use a paging channel in some cases. For example, there is typically only a limited number of traffic channels available in the sector or other wireless coverage area serving the mobile station. If those limited traffic channel resources are being heavily used, then it may not be desirable to keep the traffic channel assigned to the mobile station simply to transmit a voice mail indication to the mobile station at a later time. Instead, it may be more efficient to release the traffic channel, making it available to other mobile stations, and use a paging channel to transmit the voice mail indication.

In order to balance these competing considerations, the determination of whether to release a traffic channel assigned to a mobile station or to keep the traffic channel assigned to the mobile station while the caller interacts with the voice mail system may involve an evaluation of the level of usage of traffic channel resources. If usage of traffic channel resources is sufficiently low (e.g., below a predetermined threshold level), the traffic channel could be kept assigned to the mobile station while the caller interacts with the voice mail system. If the caller leaves a voice mail message, the traffic channel may then be used to transmit a voice mail indication to the mobile station. On the other hand, if usage of traffic channel resources exceeds the predetermined threshold level, the traffic channel could be released. Then, if the caller leaves a voice mail message, a paging channel may be used to transmit a voice mail indication to the mobile station. In this way, either a traffic channel or a paging channel could be used to transmit a voice mail indication to a mobile station, depending on which approach is more efficient in a given situation.

2. Exemplary Network Architecture

Figure 1:
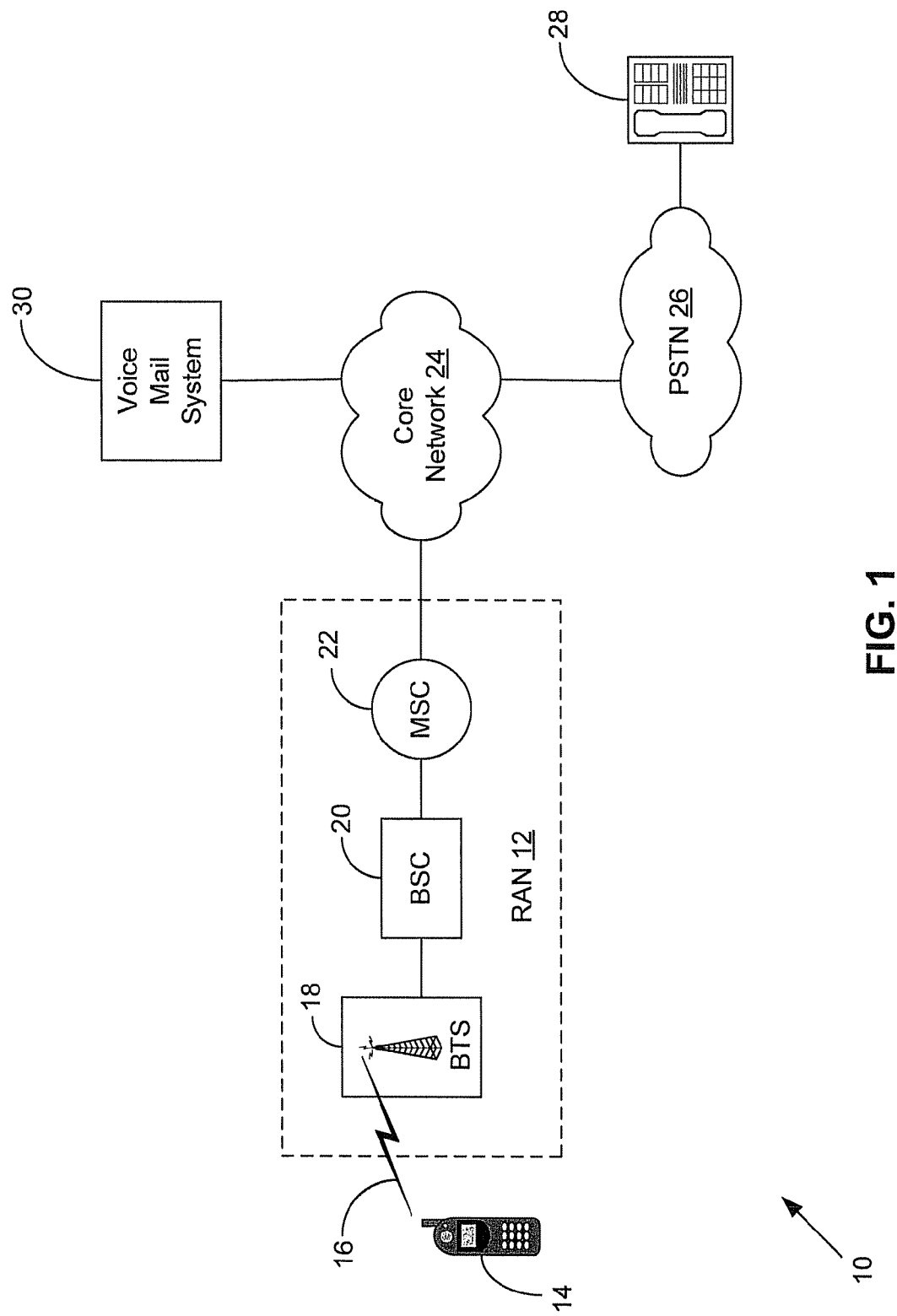
FIG. 1 is a block diagram of a telecommunications network, in accordance with an exemplary embodiment.

FIG. 1 illustrates an exemplary telecommunications network 10, in which an exemplary method may be employed. Telecommunications network 10 may include a radio access network (RAN) 12 that can communicate with mobile stations, such as mobile station 14, via an air interface 16. Mobile station 14 could be a wireless telephone, wireless personal digital assistant (PDA), wirelessly-equipped portable computer, or other wireless communication device. The communications over air interface 16 may be in a format such as IS-95 CDMA, CDMA2000, EVDO (IS-856), WiMAX (IEEE 802.16), GSM/GPRS, or other air interface format.

RAN 12 may include one or more base transceiver stations (BTSs), exemplified in FIG. 1 by BTS 18. Each BTS may provide one or more wireless coverage areas, such as cells or sectors, for communications with mobile stations, such as mobile station 14. In an exemplary embodiment, BTS 18 provides wireless coverage in a plurality of sectors. Each sector of BTS 18 may support a plurality of forward link channels for transmitting wireless communications to mobile stations and a plurality of reverse link channels for receiving wireless communications channels from mobile stations such as mobile station 14.

In the case of an IS-95 CDMA air interface, a sector may support 64 forward link channels, which are identified by distinct Walsh codes. The forward link channels may include a pilot channel, a synchronization channel, one or more paging channels, and up to 61 forward traffic channels. Additional channels may be provided by using additional carrier frequencies. The paging channels are control channels that are used to send control information to mobile stations. In addition, a sector's paging channel is typically a shared resource that can be used to send communications to any of the mobile stations in that sector. In contrast, a forward traffic channel is typically assigned to a specific mobile station for a specific call. Thus, a forward traffic channel may be assigned to a mobile station that requests origination of a call, and a forward traffic channel may be assigned to a mobile station in order to route a call to that mobile station. The voice, data, or other media from the caller may then be transmitted to the mobile station over its assigned forward traffic channel.

An IS-95 CDMA air interface may support a plurality of reverse link channels, including a plurality of access channels and a plurality of reverse traffic channels. The access channels may be used for mobile stations to transmit control information to the network, such as call origination requests. Once a call is established, a mobile station may then use a reverse traffic channel to transmit voice, data, or other media for the call.

It is to be understood that the foregoing discussion of forward link and reverse link channels in an IS-95 CDMA air interface is intended to be illustrative only. Other air interface fog mats may include other types of forward link and/or reverse link channels. Such forward link channels may include one or more wireless control channels (such as paging channels) for transmitting control information to mobile stations and one or more wireless traffic channels (such as fundamental traffic channels or supplemental traffic channels) for transmitting voice, data, or other media to a mobile station during a call.

RAN 12 may include a base station controller (BSC) 20 that controls one or more BTSs, such as BTS 18, in RAN 12. BSC 20 may, for example, control the usage of traffic channel resources, including when forward traffic channels are assigned to mobile stations and when they are released. BSC 20 may, in turn, be controlled by a mobile switching center (MSC) 22.

Although FIG. 1 shows RAN 12 with only one BTS, one BSC, and one MSC, it is to be understood that RAN 12 could include a plurality of BTSs, BSCs, and/or MSCs. In addition, the division of the functions of RAN 12 into BTS, BSC, and MSC network elements is exemplary only. The functions of RAN 12 may be distributed over these network elements in different ways. Also, RAN 12 may include additional and/or different network elements than what is illustrated in FIG. 1.

RAN 12 may be communicatively coupled to a core network 24 that enables mobile stations, such as mobile station 14, to communicate with endpoints outside of RAN 12. For example, core network 24 may be communicatively coupled to the public switched telephone network (PSTN) 26. In this way, mobile stations, such as mobile station 14, may originate calls to or receive calls from landline stations, such as telephone 28, via RAN 12, core network 24, and PSTN 26. In addition, core network 24 may supports calls with other wireless communication devices via other RANs. Core network 24 may also support calls with packet endpoints via packet-switched networks, such as the Internet. Such packet endpoints may include, for example, voice-over-packet communication devices, streaming media servers, gaming servers, instant messaging servers, and/or e-mail servers.

RAN 12 could be communicatively coupled to core network 24 in various ways. FIG. 1 shows MSC 22 connected to core network 24. Alternatively or additionally, BSC 20 may be communicatively coupled to core network 24 via a packet data serving node (PDSN) in order to support packet data service in RAN 12.

Core network 24 may be communicatively coupled to a voice mail system 30. Voice mail system 30 may allow callers to record voice mail messages for mobile station subscribers. Mobile station subscribers may then be able to access voice mail system 30, using a mobile station, landline station, and/or other type of communication device, to retrieve their voice mail messages.

As described in more detail below, RAN 12 may be configured to redirect a call upon a no-answer condition (e.g., when a user of the called mobile station does not answer a call within a predetermined period of time or chooses to ignore the call) to voice mail system 30. If the caller leaves a voice mail message on voice mail system 30, RAN 12 may be configured to transmit an indication of the voice mail message to the mobile station.

In response to the voice mail indication, the mobile station may provide an indication to the user that a new voice mail message has been received. The indication could be an audible indication, a vibration, a graphical indication, or a combination thereof. For example, the mobile station may display an icon or text message indicating that a new voice mail message is available and/or indicating the total number of voice mail messages that are available. The mobile station could also display other information regarding the voice mail message, such as an identification of the caller who recorded the voice mail message or the duration of the voice mail message. The user may then be able to use the mobile station to access voice mail system 30, via RAN 12 and core network 24, to retrieve the voice mail message. For example, the user may be able to listen to the voice mail message, receive a textual interpretation of the voice mail message, download the voice mail message, or retrieve the voice mail message in some other way.

3. Exemplary Method of Operation

Figure 2:
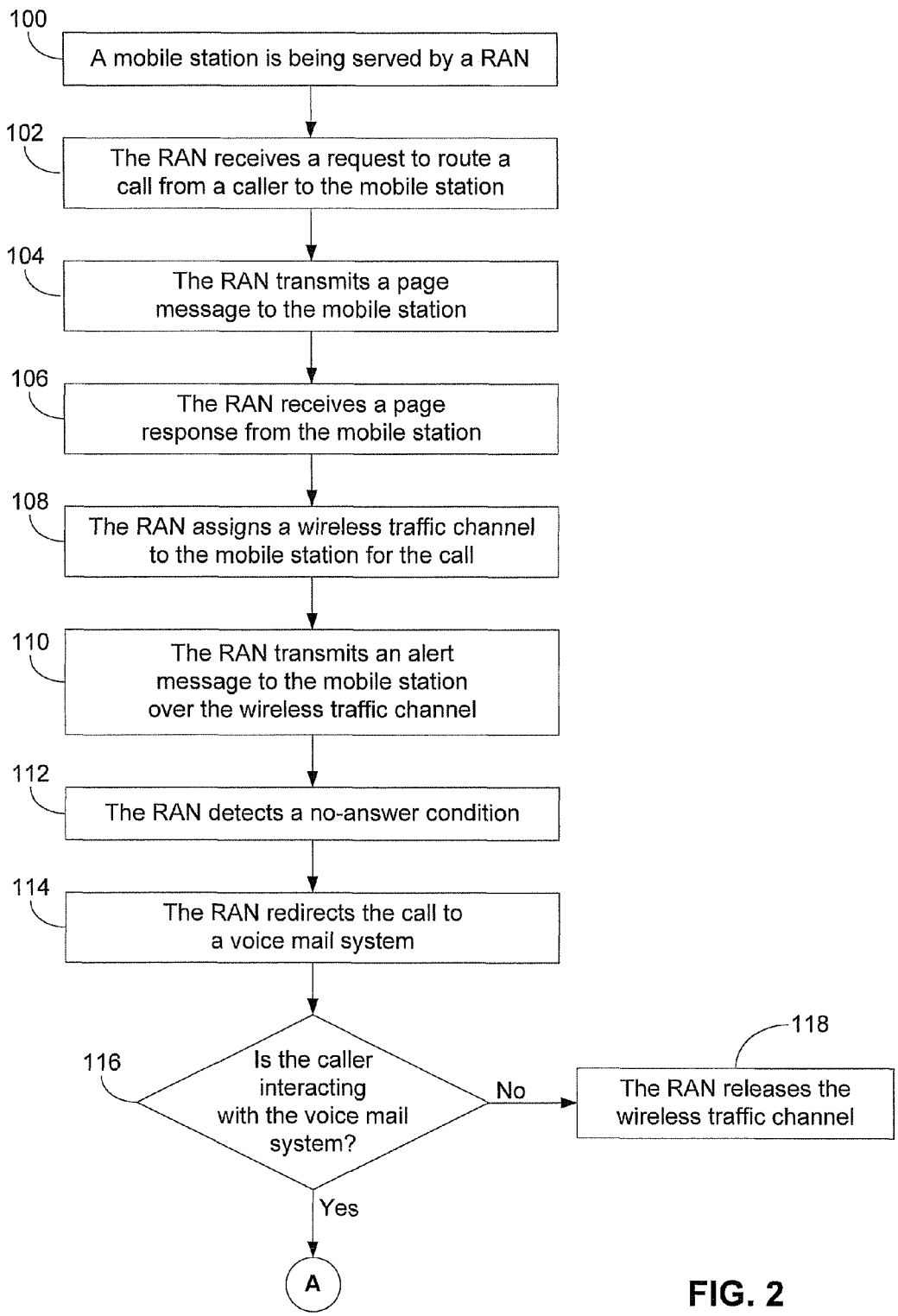
FIG. 2 is a flow chart illustrating a method of operation, in accordance with an exemplary embodiment.
Figure 3:
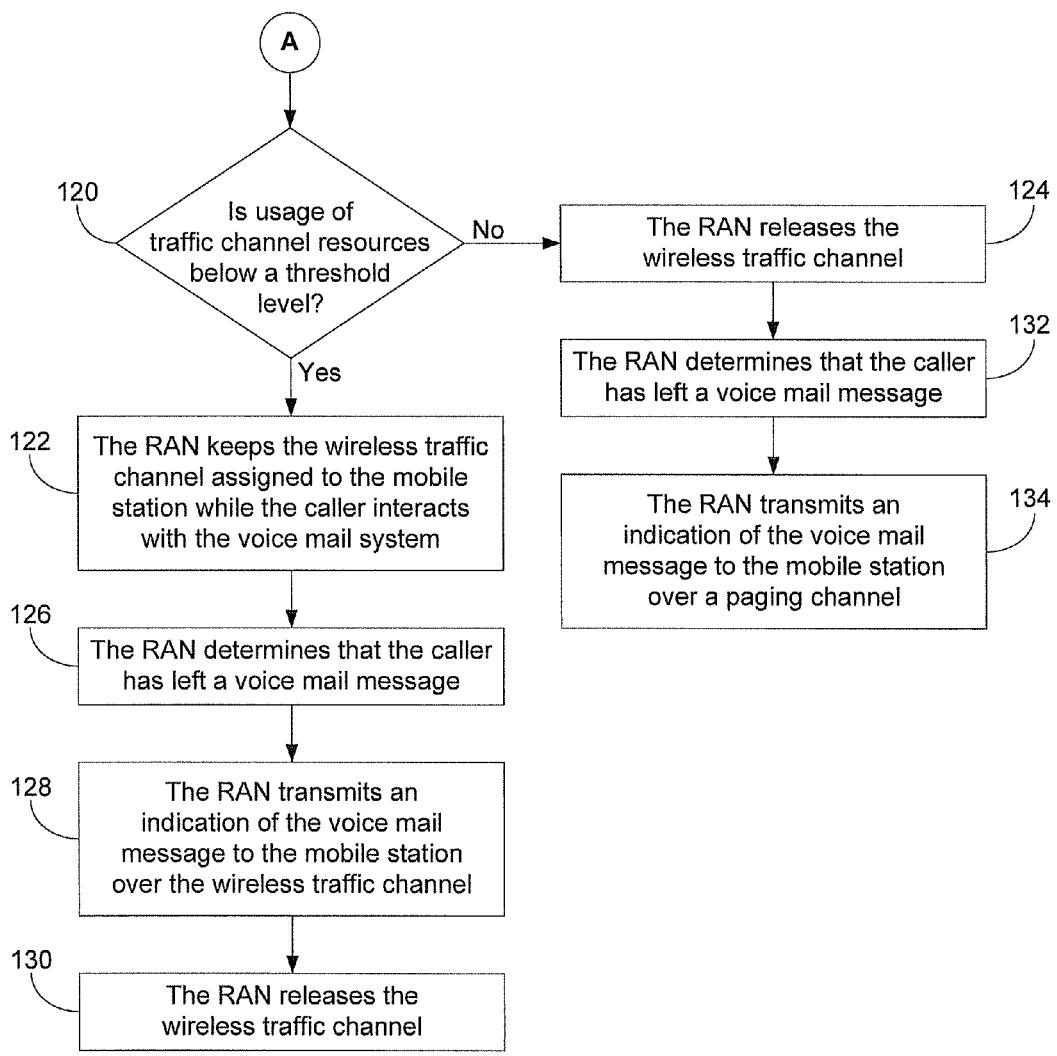
FIG. 3 is a flow chart further illustrating the method of FIG. 2, in accordance with an exemplary embodiment.

FIGS. 2 and 3 are flowcharts illustrating an exemplary method of operation. This exemplary method is described with reference to telecommunications network 10 shown in FIG. 1. It is to be understood, however, that other network architectures could be used.

With reference to FIG. 2, the method may begin with a mobile station (e.g., mobile station 14) being served by a RAN (e.g., RAN 12), as indicated by block 100. For example, the mobile station could be in an idle state in which the mobile station is not involved in a call but still monitors a paging channel (e.g., a paging channel of BTS 18) for any messages intended for it.

At some point, the RAN receives a request to route a call from a caller to the mobile station, as indicated by block 102. The caller could be using a landline station, such as telephone 28 coupled to PSTN 26. Alternatively, the caller could be using a wireless communication device (such as another mobile station), a voice-over-packet communication device coupled to a packet-switched network, or some other type of communication device.

In response to the request, the RAN may transmit a page message to the mobile station (e.g., using the paging channel that the mobile station is monitoring), as indicated by block 104. The mobile station may answer the page message by transmitting a page response over an access channel. Thus, the RAN may receive a page response from the mobile station, as indicated by block 106.

Having received a page response from the mobile station, the RAN may assign a wireless traffic channel to the mobile station for the call, as indicated by block 108. For example, BSC 20 may instruct BTS 18 to assign one of its forward traffic channels to the mobile station for the call. In response, BTS 18 may send another message to the mobile station over the paging channel to indicate the forward traffic channel assigned to the mobile station, and the mobile station may tune to that channel.

The RAN may then transmit an alert message to the mobile station over the wireless traffic channel, as indicated by block 110. In response to the alert message, the mobile station may generate an alert indication to alert the user of the incoming call. The alert indication may include an audible indication (e.g., a ring tone), a vibration, a graphical indication, or other indication discernible to the user. If the user notices the alert indication, the user may interact with the mobile station's user interface to answer the call. Alternatively, the user may choose to let the alert indication continue without answering, or the user may interact with the mobile station's user interface to indicate that the user is ignoring the call. Of course, a call could also go unanswered if a mobile station's user does not notice the alert indication, for example, if the user is away from the mobile station or is occupied with other tasks.

Thus, the RAN may detect a no-answer condition, as indicated by block 112. The no-answer condition may occur, for example, when the user has not answered the call within a predetermined period of time or when the user has chosen to ignore the call. In response to the no-answer condition, the RAN may redirect the call to a voice mail system (e.g., voice mail system 30), as indicated by block 114.

The RAN may also decide whether the wireless traffic channel that was assigned to the mobile station for the call should be released. To make this decision, the RAN may determine whether the caller is interacting with the voice mail system to leave a voice mail message, as indicated by block 116. If the caller does not interact with the voice mail system (e.g., hangs up after being redirected to voice mail), the RAN may release the wireless traffic channel, as indicated by block 118. If the caller is interacting with the voice mail system, then the RAN may further determine whether usage of traffic channel resources is below a predetermined threshold level, as indicated by block 120. If usage is below the predetermined threshold level, the RAN may keep the wireless traffic channel assigned to the mobile station while the caller interacts with the voice mail system, as indicated by block 122. If usage exceeds the predetermined threshold level, the RAN may release the wireless traffic channel, as indicated by block 124.

To make the determination of block 116, the RAN may query the voice mail system to determine the state of the caller's interaction with the voice mail system. For example, if the caller is listening to a recorded greeting from the mobile station's subscriber, then the RAN may determine that the caller is likely to leave a voice mail message and the RAN may keep the wireless traffic channel assigned to the mobile station. Alternatively, the RAN may wait to see whether the caller begins recording a voice mail message before determining whether to release the wireless traffic channel assigned to the mobile station. In another approach, rather than querying the voice mail system, the RAN may wait to receive reports from the voice mail system regarding the state of the caller's interaction with the voice mail system.

To make the determination of block 120, the RAN could evaluate the usage of traffic channel resources in the mobile station's sector (e.g., the number of forward traffic channels in the mobile station's sector being used or the percentage of the sector's total number forward traffic channels that are being used) and compare that usage to a predetermined threshold level of usage (e.g., expressed as a number of traffic channels or as a percentage of the total number of traffic channels). As discussed above, in the case of an IS-95 CDMA air interface, a sector might support a maximum of 61 forward traffic channels on a given carrier frequency. Other air interface formats may have different limitations on the number of forward traffic channels that can be used. If usage of a sector's limited number of forward traffic channels is below a predetermined threshold level (e.g., below a predetermined number or percentage), then the RAN may keep the forward traffic channel assigned to the mobile station (as indicated by block 122). Otherwise, the RAN may release the forward traffic channel so that it can be used for calls involving other mobile stations (as indicated by block 124).

At some point, the RAN may determine that the caller has left a voice mail message, as indicated by block 126. The RAN may make this determination, for example, by querying the voice mail system or by receiving a notification from the voice mail system. In response, the RAN may transmit an indication of the voice mail message to the mobile station over the wireless traffic channel assigned to the mobile station, as indicated by block 128. Thereafter, the RAN may release the wireless traffic channel, as indicated by block 130. In this way, the RAN may keep the wireless traffic channel assigned to the mobile station while the caller interacts with the voice mail system and then use the wireless traffic channel to transmit a voice mail indication to the mobile station once the caller has left a voice mail message.

On the other hand, the RAN may determine that the caller has left a voice mail message after the wireless traffic channel has been released, as indicated by block 132. The wireless traffic channel may have been released because of a high usage of traffic channel resources (as in blocks 120 and 124), because the caller's interaction with the voice mail system has timed out, because the wireless traffic channel was needed for another call involving another mobile station, or for some other reason. In such cases, the RAN may transmit an indication of the voice mail message to the mobile station over a paging channel, as indicated by block 134. Thus, the RAN may transmit a voice mail indication to a mobile station over either a traffic channel or a paging channel, depending on resource usage.

It is to be understood, however, that the method illustrated in FIGS. 2 and 3 is exemplary only. For example, other criteria may be used to determine whether to release the wireless traffic channel assigned to the mobile station or to keep the wireless traffic channel assigned to the mobile station while the caller interacts with the voice mail system. Instead of trying to determine the state of the caller's interaction with the voice mail system, the RAN may simply delay releasing the wireless traffic for a preset time period in order to allow the caller an opportunity to leave a voice mail message. Once the caller has left a voice mail message (e.g., as indicated by a notification that the RAN receives from the voice mail system), the RAN may determine whether the wireless traffic channel is still assigned to the mobile station. If the wireless traffic channel is still assigned to the mobile station (e.g., because the preset time period has not yet expired), then the RAN may use that wireless traffic channel to transmit a voice mail indication to the mobile station. If the wireless traffic channel has been released (e.g., because the preset time period has expired), then the RAN may transmit a voice mail indication to the mobile station over a paging channel.

In this way, a voice mail indication may be transmitted to a mobile station over a wireless traffic channel in some circumstances, such as when usage of traffic channel resources is sufficiently low, or over a wireless control channel (e.g., a paging channel) in other circumstances, such as when usage of traffic channel resources is high.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
   receiving a request to route a call from a caller to a mobile station;
   assigning a wireless traffic channel to said mobile station for said call;
   detecting a no-answer condition for said call;
   in response to said no-answer condition, redirecting said call to a voice mail system;
   keeping said wireless traffic channel assigned to said mobile station while said caller interacts with said voice mail system;
   determining that said caller has left a voice mail message on said voice mail system; and
   transmitting an indication of said voice mail message to said mobile station over said wireless traffic channel.

2. The method of claim 1, wherein detecting a no-answer condition for said call comprises:
   determining that a user of said mobile station has not answered said call after a predetermined period of time.

3. The method of claim 1, wherein detecting a no-answer condition for said call comprises:
   determining that a user of said mobile station has chosen to ignore said call.

4. The method of claim 1, further comprising:
   releasing said wireless traffic channel after transmitting said indication of said voice mail message.

5. The method of claim 1, further comprising:
   after detecting said no-answer condition, determining that usage of traffic channel resources is sufficiently low to keep said wireless traffic assigned to said mobile station.

6. The method of claim 1, further comprising:
   after redirecting said call to said voice mail system, determining whether said caller is interacting with said voice mail system.

7. The method of claim 1, further comprising:
   in response to said request, transmitting a page message to said mobile station over a wireless control channel.

8. The method of claim 7, wherein said wireless control channel is a paging channel.

9. The method of claim 7, further comprising:
   receiving a page response from said mobile station over a wireless access channel.

10. The method of claim 9, wherein said wireless traffic channel is assigned to said mobile station after said page response is received from said mobile station.

11. The method of claim 10, further comprising:
    transmitting an alert message to said mobile station over said wireless traffic channel.

12. A system, comprising:
    a voice mail system for receiving voice mail messages; and
    a radio access network (RAN) for communicating with mobile stations over wireless traffic channels and wireless control channels, wherein said RAN is configured to (i) assign a wireless traffic channel to a mobile station for a call from a caller, (ii) redirect said call to said voice mail system in response to a no-answer condition for said call, and (iii) keep said wireless traffic channel assigned to said mobile station while said caller interacts with said voice mail system, if usage of traffic channel resources is below a predetermined level.

13. The system of claim 12, wherein said RAN is further configured to release said wireless traffic channel after said no-answer condition, if usage of traffic channel resources in said RAN is above said predetermined level.

14. The system of claim 12, wherein said RAN is communicatively coupled to said voice mail system via a core network.

15. The system of claim 12, wherein said RAN is further configured to determine that said caller has left a voice mail message on said voice mail system and responsively transmit an indication of said voice mail message to said mobile station.

16. The system of claim 15, wherein said RAN transmits said indication over said wireless traffic channel, if said wireless traffic channel is still assigned to said mobile station, and wherein said RAN transmits said indication over a wireless control channel, if said wireless traffic channel has been released.

17. A method for a radio access network (RAN), said RAN being able to communicate with mobile stations over wireless traffic channels and wireless control channels, said method comprising:
    said RAN receiving a request to route a call from a caller to a mobile station;
    said RAN assigning a wireless traffic channel to said mobile station for said call;
    said RAN detecting a no-answer condition for said call;
    after detecting said no-answer condition, said RAN:
    (a) redirecting said call to a voice mail system;
    (b) determining whether usage of traffic channel resources exceeds a threshold level;
    (c) if usage of traffic channel resources exceeds said threshold level, releasing said wireless traffic channel; and (d) if usage of traffic channel resources does not exceed said threshold level, keeping said wireless traffic channel assigned to said mobile station while said caller interacts with said voice mail system.

18. The method of claim 17, further comprising:

said RAN determining that said caller has left a voice mail message on said voice mail system; and said RAN determining whether said wireless traffic channel is still assigned to said mobile station.

19. The method of claim 18, further comprising:

if said wireless traffic channel is still assigned to said mobile station, said RAN transmitting an indication of said voice mail message to said mobile station over said wireless traffic channel.

20. The method of claim 18, further comprising:

if said wireless traffic channel has been released, said RAN transmitting an indication of said voice mail message to said mobile station over a wireless control channel.

\* \* \* \* \*